(12) United States Patent
Elsayed et al.

(10) Patent No.: US 12,480,899 B2
(45) Date of Patent: Nov. 25, 2025

(54) METHOD TO MEASURE ACID DIVERSION EFFICIENCY IN MATRIX ACIDIZING THROUGH NMR

(71) Applicant: KING FAHD UNIVERSITY OF PETROLEUM AND MINERALS, Dhahran (SA)

(72) Inventors: Mahmoud Elsayed, Dhahran (SA); Mohamed Mahmoud, Dhahran (SA); Murtada Saleh Aljawad, Dhahran (SA); Ammar El-Husseiny, Dhahran (SA); Ahmed Binghanim, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 615 days.

(21) Appl. No.: 18/077,738

(22) Filed: Dec. 8, 2022

(65) Prior Publication Data

US 2024/0192155 A1 Jun. 13, 2024

(51) Int. Cl.
*G01N 24/08* (2006.01)
*G01N 15/08* (2006.01)
*G01N 33/24* (2006.01)

(52) U.S. Cl.
CPC ........... *G01N 24/081* (2013.01); *G01N 15/08* (2013.01); *G01N 33/24* (2013.01)

(58) Field of Classification Search
CPC ....... G01N 15/08; G01N 24/081; G01N 33/24
See application file for complete search history.

(56) References Cited

U.S. PATENT DOCUMENTS

| 8,278,922 B2 | 10/2012 | Hurlimann et al. |
| 11,099,292 B1 | 8/2021 | Vinegar et al. |
| (Continued) | | |

FOREIGN PATENT DOCUMENTS

CN 113984589 A 1/2022

OTHER PUBLICATIONS

Mahmoud, Mohamed. "Determination of the optimum wormholing conditions in carbonate acidizing using NMR." Journal of Petroleum Science and Engineering 159 (2017): 952-969. (Year: 2017).*

(Continued)

*Primary Examiner* — Robert J Eom
(74) *Attorney, Agent, or Firm* — Oblon, McClelland, Maier & Neustadt, L.L.P.

(57) ABSTRACT

A method to measure acid diversion efficiency in rock samples. The method includes measuring a first porosity and a permeability of the rock samples. The method includes flooding a core region of the rock sample with a hydrochloric acid (HCl) system to create a wormhole, wherein during the flooding the HCl system penetrates from a first end of the rock sample to a second end of the rock sample to form the wormhole. The method includes measuring a second porosity, a pore size distribution, and a diffusion tortuosity of the rock samples with NMR. The method includes establishing a diversion index (DI) based off a ratio between the diffusion tortuosity in a first direction and the diffusion tortuosity in a second direction. The method includes determining the acid diversion efficiency based off the diversion index.

19 Claims, 4 Drawing Sheets

(56) References Cited

U.S. PATENT DOCUMENTS

| | | |
|---|---|---|
| 11,143,607 B2 * | 10/2021 | Elsayed ................. G01R 33/46 |
| 11,299,986 B2 | 4/2022 | Elsayed et al. |
| 11,371,335 B2 | 6/2022 | Kwak et al. |
| 2021/0372954 A1 | 12/2021 | Elsayed |

OTHER PUBLICATIONS

Elsayed, et al. ; New Technique for Evaluating Fracture Geometry and Preferential Orientation Using Pulsed Field Gradient Nuclear Magnetic Resonance ; SPE J. 26 (05) ; Oct. 13, 2021 ; 2 Pages.

Zecca, et al. ; NMR Measurements of Tortuosity in Partially Saturated Porous Media ; Transport in Porous Media ; Mar. 19, 2018 ; 18 Pages.

* cited by examiner

METHOD TO MEASURE ACID DIVERSION EFFICIENCY IN MATRIX ACIDIZING THROUGH NMR

CROSS-REFERENCE TO RELATED APPLICATION

The present application is related to "Method to Measure Acid Diversion Efficiency in Rock Sample", which is incorporated herein by reference in its entirety.

BACKGROUND

Technical Field

The present disclosure is directed to matrix acidizing in subterranean geological formations, and particularly, to a method to measure acid diversion efficiency in carbonate formations.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Matrix acidizing is a well stimulation method applied to improve rock permeability or remove formation damage. An acid creates high permeability paths (i.e., wormholes) in carbonate rocks, which bypass a damaged zone. In heterogeneous formations, the acid overstimulates the formation's high permeable sections, leaving tight rock sections understimulated. Hence, various diverters, such as mechanical, solid, and chemical diverters, are applied to direct the acid towards the tight rock sections, creating uniform stimulation. Mechanical diverters are used to seal a formation section, preventing it from communicating with the wellbore. Packers, ball sealers, and coil tubing are common mechanical diverters (Aljawad, Murtada Saleh, et al. "Integration of field, laboratory, and modeling aspects of acid fracturing: A comprehensive review." Journal of Petroleum Science and Engineering 181 (2019): 106158). On the other hand, solid diverters are made of solid particles such as wax beads, fiber, and benzoic acid flakes (Gomaa, A. M., Nino-Penaloza, A., McCartney, E., & Mayor, J. (2016, February 1). Engineering Solid Particulate Diverter to Control Fracture Complexity: Experimental Study. In SPE Hydraulic Fracturing Technology Conference. Society of Petroleum Engineers). These solid diverters are believed to accumulate at the reservoir's high permeability sections, creating solid barriers. They usually degrade after the stimulation job at reservoir conditions (McCartney, E., Al-Othman, M., Alam, A., Nino-Penaloza, A., Pirogov, A., Nagarkoti, M., Mendez, A. (2017, October 9). Enhanced Acid Fracturing with Improved Fluid Loss Control and Near Wellbore Diversion Increases Production in Kuwait. In SPE Annual Technical Conference and Exhibition. Society of Petroleum Engineers). Chemical diverters are high viscosity fluid systems that divert themselves while reacting with the formation. Viscoelastic surfactant (VES), crosslinked gels, emulsifiers, and foamed fluids are common chemical diverters (Kalfayan, L. J., & Martin, A. N. (2009, January). The Art and practice of acid placement and diversion: history, present state, and future. In SPE Annual Technical Conference and Exhibition. Society of Petroleum Engineers).

The diversion capacity of chemical diverters can be related to the tortuosity of the wormhole created during acidizing. Acid diversion efficiency is a measure of how equally the acid is distributed over the stimulated zones. Conventional methods to determine the acid diversion efficiency are inaccurate, and labor-intensive. Hence, there is a need of an efficient methods which may overcome the aforementioned limitations. One object of the present disclosure is to provide a method and system for measuring and determining the diversion efficiency of chemical diverters.

SUMMARY

In an exemplary embodiment, a method to measure acid diversion efficiency in a rock sample is described. The method includes measuring a first porosity and a permeability of the rock sample. The method further includes flooding a core region of the rock sample with a hydrochloric acid (HCl) system to create a wormhole, wherein during the flooding the HCl system penetrates from a first end of the rock sample to a second end of the rock sample to form the wormhole. The method further includes measuring, with NMR, a first diffusion tortuosity $\tau_{d,x}$ in an X-direction corresponding to a direction orthogonal to the wormhole; and measuring, with NMR, a second diffusion tortuosity $\tau_{d,y}$ in a Y-direction corresponding to a direction parallel to the wormhole. The method further includes calculating a diversion index (DI) by the following formula:

$$DI + \frac{\tau_{d,y}}{\tau_{d,x}}$$

In some embodiments, an NMR logging tool remains placed in the wormhole at two pressure regimes.

In some embodiments, if the diversion index is above 0.7, an operator can begin hydrofracking on a bore hole a subterranean rock formation.

In some embodiments, the HCl system is at least one selected from the group consisting of a solution comprising hydrochloric acid, a solution comprising HCl and a viscoelastic surfactant (VES), and a solution comprising HCl and a polymer.

In some embodiments, the method further comprises flooding the rock sample with at least one acid selected from the group consisting of acetic acid, citric acid, formic acid, a polymer-based acid, a VES acid, an emulsified acid, a foam acid, and a chelating agent-containing stimulation fluid.

In some embodiments, the HCl system comprises HCl and the VES as a mixture containing from 10 weight % (wt. %) to 20 wt. % hydrochloric acid per weight of the solution and of from 1 wt. % to 5 wt. % VES per weight of the solution.

In some embodiments, the HCl system comprises the HCl and the polymer as a mixture containing from 10 wt. % to 20 wt. % hydrochloric acid per weight of the solution and of from 0.02 wt. % to 0.1 wt. % of a polyacrylamide (PAM) per weight of the solution.

In some embodiments, the measuring the first porosity of the rock sample includes treating the rock sample with potassium chloride (KCl).

In some embodiments, the measuring the permeability of the rock sample includes treating the rock sample with the KCl.

In some embodiments, the rock sample is a carbonate formation rock with a permeability of 1 to 50 millidarcy.

In some embodiments, the rock sample has a porosity of 5-50%.

In some embodiments, the flooding is carried out at a temperature of 80-120° C.

In some embodiments, the HCl system has a pH of 1-6.

In some embodiments, the HCl system comprises HCl and the VES and has a pH of 1-6.

In some embodiments, the HCl system comprises HCl and the PAM and has a pH of 1-6.

In some embodiments, the method further comprises verifying the acid diversion efficiency to computed tomography (CT) scans of the wormholes in the rock samples.

In some embodiments, the method further comprises measuring, with NMR, the diffusion tortuosity in a third z-direction.

In some embodiments, if the diversion index is below 0.7, a different HCl system is deployed with HCl at a concentration of 25 wt. % to 40 wt. % per weight of the HCl system.

In some embodiments, if the diversion index is below 0.7, a different HCl system comprising HCl and VES is deployed with HCl at a concentration of 25 wt. % to 40 wt. % per weight of the HCl system and 5 wt. % to 15 wt. % per weight of VES of the system.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein the term 'porosity' is a percentage determined from the volume of open pores in the test specimen (rock samples) to and its exterior volume. Porosity reflects the porous medium's capacity to store fluids. Porosity can be an initial indication about tortuosity of the porous medium.

As used herein, the term 'tortuosity' is the ratio of the actual flow path length to the straight distance between the ends of the flow path.

As used herein, the term 'geometric tortuosity' ($\tau_g$) refers to the ratio between a streamline length taken by a particle within the porous medium to its core length.

As used herein, the term 'diffusive tortuosity' ($\tau_d$) is the ratio between free self-diffusion coefficient of the bulk fluid ($D_o$) to a free self-diffusion coefficient of a restricted fluid ($D_R$) within the porous medium. The diffusive tortuosity ($\tau_d$) can be represented by the given formula.

$$\tau_d = \frac{D_o}{D_R}$$

As used herein, the term 'pore size distribution' refers to the relative abundance of each pore size in a representative volume of a rock sample.

As used herein, the term 'permeability' refers to the measure of the ease of flow of a fluid through a porous solid.

Aspects of the present disclosure are directed towards a method to measure/evaluate the effectiveness of acid treatment/acid diversion efficiency in subterranean geological formations using diffusional tortuosity data obtained from NMR measurements. For example, limestone rock samples are treated with an HCl acid systems, e.g., a composition comprising HCl, to create different wormhole patterns. The diffusion tortuosity in each of these rock samples are measured using NMR. The diffusion tortuosity measurements are measured in an X-direction (i.e., the direction orthogonal to the wormhole), and in a Y-direction (i.e., direction parallel to the wormhole). The ratio between the diffusion tortuosity orthogonal to the wormhole and the diffusion tortuosity parallel to the wormhole is used to calculate the diversion efficiency. Higher values of this ratio indicate better diversion efficiency when verified with CT scan images. In other words, acidizing treatment that results in wormholes having relatively greater orthogonal tortuosity indicate improved acid diversion efficiency.

Figure 1:
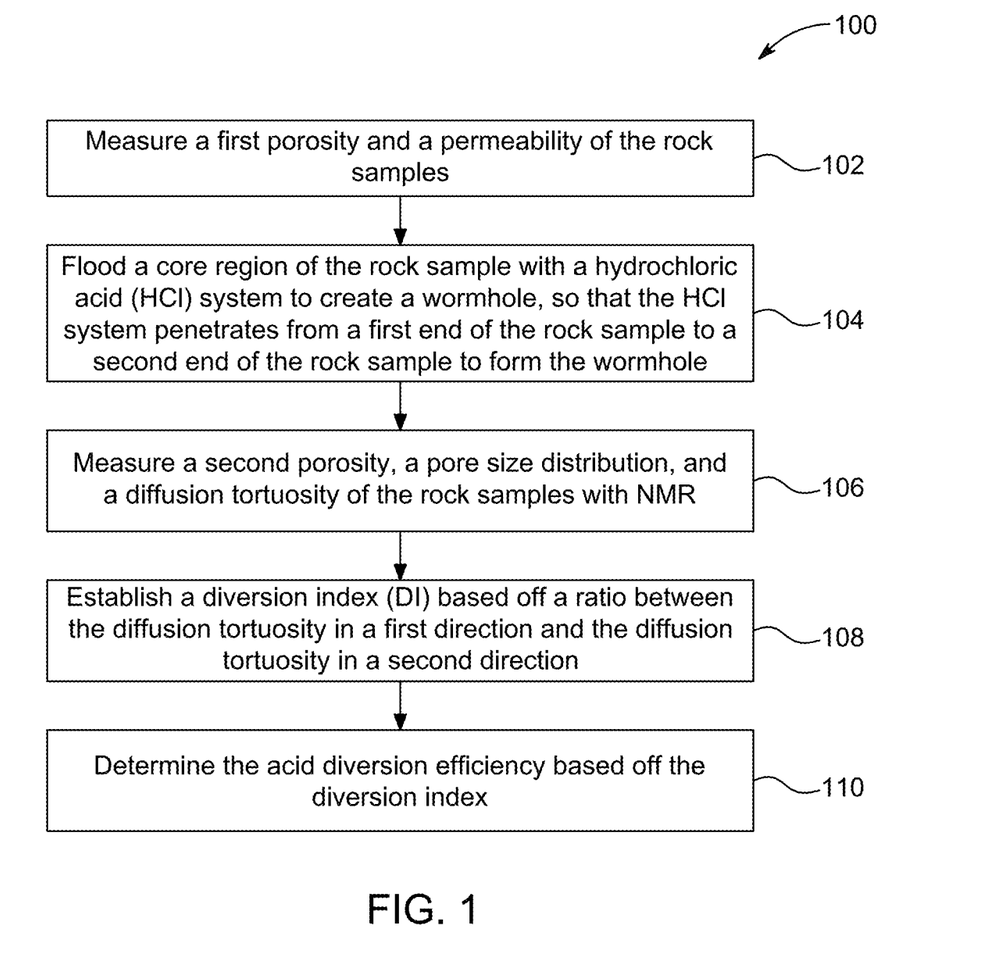
FIG. 1 is a schematic flow chart of a method to measure acid diversion efficiency in rock samples, according to certain embodiments.

FIG. 1 illustrates a schematic flow chart of a method 100 to measure acid diversion efficiency in rock samples. The order in which the method 100 is described is not intended to be construed as a limitation, and any number of the described method steps can be combined in any order to implement the method 100.

At step 102, the method 100 includes measuring a first porosity and a permeability of the rock samples (e.g., carbonate rock samples). In some embodiments, the method can be implemented on other sub-terramean geological formations such as, a depleted oil reservoir, a depleted gas reservoir, a sour reservoir, a hydrocarbon-bearing subterranean formation, a saline formation, or an un-mineable coal bed. In an embodiment, the rock samples may be a sedimentary rock, igneous rock, and/or a metamorphic rock sample. In an embodiment, the rock samples are carbonate formations. In an embodiment, composition of the rock samples may include basalt, gabbro, granite, granodiorite, diorite, syenite and ultramafic. In one embodiment, the method relies on commercially available drilling assemblies incorporating NMR apparatus among other sensors for providing the real-time measurement of down-hole rock properties. The non-limiting examples include ProVision Plus (magnetic resonance while drilling apparatus by Schlumberger). The apparatus and the software acquires T2 data derived from pore size and fluid properties within several seconds, the T2 data can be further processed to quantify bound and free-fluid volume and capillary-bound water. T2 relaxation is the process by which the transverse components of magnetization (Mxy) decay or dephase. T2 relaxation is considered to follow first-order kinetics, resulting in a simple exponential decay (like a radioisotope) with time constant T2. Thus, T2 is the time required for the transverse magnetization to fall to approximately 37% (1/e) of its initial value and T2 data is a set of time values required to do so. T2 relaxation can also refer to transverse relaxation and spin-spin relaxation. T2 data is used in the current invention to get both a timely and accurate porosity and permeability measurement. NMR signal decay data helps ascertain permeability, producible porosity, and irreducible water saturation as well as capillary pressure curves, hydrocarbon identification, and facies analysis. A real-time permeability log enables predicting production rates to speed up completion and stimulation programs.

Analogously, Halliburton Sperry Drilling apparatus and software provides logging-while-drilling (LWD) nuclear magnetic resonance (NMR) source-less porosity solutions to measure petrophysical properties of the reservoir through a mineralogy-independent porosity assessment. The apparatus (MRIL®-WD™ Magnetic Resonance Imaging Logging-While-Drilling Sensor) determines the total porosity of a reservoir, movable fluid volume, capillary bound fluid volume, and micro-porosity—essential information to allow a user to determine which fluids produce hydrocarbons upon stimulation. By calculating a qualitative estimate of permeability, a user identifies which reservoir intervals have greater flow, and can better target the optimal spots for increased production.

In an embodiment, a downhole NMR apparatus provides the capability to measure diffusion characteristics of rock downhole in a subterranean rock formations using magnetic gradient pulses. Diffusion NMR experiments resolve different compounds spectroscopically in a mixture based on their differing diffusion coefficients, depending on the size and shape of the molecules. Diffusion NMR may be used to resolve otherwise intractable spectra of mixtures, or it may be used to determine the size of molecules and aggregates, determining the degree of polymerization, size of a solvation shell or other microscopic structure. The spectra produced resemble chromatograms in some respects while also providing NMR information that can be used for the assignment of individual components.

The first porosity and permeability measured in step 102 refer to measuring the porosity and permeability of the rock samples before acid treatment. In an embodiment, measuring the first porosity and permeability of the rock samples further include treating the rock samples with 2.5 to 3.5% of potassium chloride (KCl), more preferably 3%. The rock samples have a permeability of 1 to 50 millidarcy (md), preferably 25 to 45 md, preferably 30 to 40 md, or 35 md. In some embodiments, the rock samples have a porosity of 5-50%, preferably 10-45%, preferably 15-40%, preferably 20-35%, or 30%.

Further in step 102, the method 100 includes measuring a first pore size distribution of the rock samples with PFG-NMR. The carbonate formations are highly heterogeneous and typically have different coefficients of diffusion in different directions. PFG-NMR methods are effectively useful in the study of diffusion anisotropy. In an embodiment, NMR PFG is used to evaluate permeability anisotropy in hydrocarbon-reservoir rock. Evaluating diffusion tortuosity in both vertical and horizontal directions (with respect to the layering direction) can quantitate the tortuosity anisotropy in hydrocarbon reservoirs and their later use for large-scale modeling of borehole productivity. If the z-direction gradient is applied, the movement of the molecules is in the vertical direction of the sample, which gives an indication of the vertical tortuosity of the rock sample. On the other hand, if the x-direction gradient is applied the movement of the molecules is in the horizontal (radial) direction. In an embodiment, a stand-alone NMR methodology (no supporting methods) determines tortuosity, porosity, pore size distributions and anisotropy of tortuosity and porosity. The advantage of a stand-alone method is simplicity of the downhole sensor assembly relying on a single apparatus to collect the log data suitable for further machine learning processing. The stand-alone method is less reliable than a method utilizing multiple principles, but may be cheaper if applied in the same basin for the same mineralogical composition. In an embodiment, time-dependence of the restricted diffusion ratios is variable for the pores of different radii and can be used to evaluate pore size distribution, together with the T2 relaxation data considered above. This method is based on different physical principles and thus represent the independent predictors of other economically important properties, such as rock permeability, wettability and mechanical strength. The time-dependence of restricted diffusion can be also anisotropic to a variable degree in different brackets of pore size At step 104, the method 100 includes flooding a core region of the rock sample with a hydrochloric acid (HCl) system to create a wormhole, e.g., by reaction and/or dissolution of the rock, wherein during the flooding the HCl system penetrates from a first end of the rock sample to a second end of the rock sample to form the wormhole. The core region can be defined as an approximate middle height of the rock sample on either the first or second end, as when the HCl gets flooded into the rock sample, there is ample area both above and below the middle height for the HCl system to travel through. In an embodiment, the flooding of the rock sample is carried out at a temperature of 80-120 degrees Celsius (° C.), preferably 95-110° C., or 105° C. Optionally, one or more diverters, such as mechanical, solid, or chemical diverters, may be used in combination with the HCl system. The mechanical diverters may include, but are not limited to, packers, ball sealers, and coil tubing. The mechanical diverters may be used to seal a formation section, preventing the formation section from communicating with a wellbore. In an embodiment, the wellbore is a portion of an oil well or a gas well, i.e., a borehole, that faces a formation matrix of the subterranean geological formation. The wellbore may include casing that is made up of one or more metals selected from one or more of stainless steel, aluminum, fiberglass, and titanium and/or a cured material such as concrete. In some embodiments, the wellbore may be a horizontal wellbore or a multilateral wellbore. In an embodiment, the HCl system is flooded into the core region of the rock sample via injection.

Further, the solid diverters may be made up of solid particles such as wax beads, fiber, and benzoic acid flakes. The solid diverters may accumulate at a reservoir's high permeability sections, creating solid barriers. The solid diverters may degrade after the stimulation job at reservoir conditions. Chemical diverters are high viscosity fluid systems that divert injection fluids while reacting with the formation. Chemical diverters may include, but are not limited to, VES crosslinked gels, emulsifiers, and foamed fluids. The diversion capacity of these chemicals can be related to the tortuosity of the wormhole created.

In an embodiment, the HCl system is at least one selected from the group consisting of a solution including hydrochloric acid, a solution including HCl and a viscoelastic surfactant (VES). The VES may include, but is not limited, to N-erucyl-N,N-bis(2-hydroxyethyl)-N-methyl ammonium chloride and potassium oleate. In an embodiment, the HCl system is a solution including HCl and a polymer. The polymer is preferably polyacrylamide (PAM). In an embodiment, the polymer may also be one or more of polystyrene, polymethacrylate, and polystyrene. In an embodiment, HCl may be substituted by one or more mineral acids such as hydrofluoric acid, hydrobromic acid, hydroiodic acid, nitric acid, sulfuric acid, phosphoric acid, perchloric acid, and boric acid.

In an embodiment, the HCl system includes a surfactant such as a non-ionic surfactant, an anionic surfactant, a cationic surfactant, a viscoelastic surfactant, or a zwitterionic surfactant. The surfactant may include, but is not limited to, ammonium lauryl sulfate, sodium lauryl sulfate (SLS), sodium dodecyl sulfate (SDS), alkyl-ether sulfates sodium laureth sulfate (sodium lauryl ether sulfate (SLES), sodium myreth sulfate, docusate (dioctyl sodium sulfosuccinate), perfluorooctanesulfonate (PFOS), perfluorobutanesulfonate, alkyl-aryl ether phosphates, alkyl ether phosphates, octenidine dihydrochloride; cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), CHAPS (3-[(3-cholamidopropyl)dimethylammonio]-1-propanesulfonate),
cocamidopropyl hydroxysultaine, ocamidopropyl betaine, phospholipids, and sphingomyelins.

In an embodiment, the surfactant present in the HCl system may include primary and secondary emulsifiers. Hereinafter, the primary and secondary emulsifiers are collectively referred to as the 'emulsifiers' or 'surfactants' and individually referred to as the 'emulsifier' or 'surfactant', unless otherwise specified. In an embodiment, the primary emulsifier is a polyaminated fatty acid. In an embodiment, the primary emulsifier includes a lower hydrophilic-lyophilic balance (HLB) with respect to the secondary emulsifier. In an embodiment, the primary emulsifier may include, but are not limited to, span 60, span 85, span 65, span 40 and span 20. In an embodiment, the primary emulsifier is sorbitan oleate, also referred to as span 80. In an embodiment, the secondary emulsifier may include, but is not limited to triton X-100, Tween 80, Tween 20, Tween 40, Tween 60, Tween 85, OP4 and OP 7. In an embodiment, the secondary emulsifier includes a biosurfactant such as a rhamnolipid surfactant.

In an embodiment, the solution including hydrochloric acid has a pH of 1-6, more preferably 2-4, or 3. In an embodiment, the solution including HCl and the VES has a pH of 1-6, more preferably 2-4, or 3. In an embodiment, the solution including HCl, and the polymer has a pH of 1-6, more preferably 2-4, or 3. HCl is used acid for carbonate acidizing treatments, which can be attributed to corresponding low cost and fast reaction with carbonate rock types.

In an embodiment, the solution including HCl and the VES is a mixture of from 10 weight % (wt. %) to 20 wt. %, preferably 12 wt. % to 18 wt. %, preferably 14 wt. % to 16 wt. %, or 15 wt. %, hydrochloric acid per weight of the solution; and of from 1 wt. % to 5 wt. %, preferably 2 wt. % to 4 wt. %, or 3 wt. %, VES per weight of the solution. In some embodiments, the HCl concentration in the VES based HCl system is in a range of 5-28 wt. %, preferably 10-20 wt. %, or 15 wt. %, and VES concentration from 1 to 7 vol. %, preferably 2 to 6 vol. %, preferably 3 to 5 vol. %, or 4 vol. %.

In some embodiments, the solution including HCl and the polymer is a mixture of from 10 wt. % to 20 wt. %, more preferably 12 to 15 wt. %, hydrochloric acid per weight of the solution and of from of from 0.02 wt. % to 0.1 wt. % of PAM, more preferably 0.03 wt. % to 0.09 wt. %, more preferably 0.04 wt. % to 0.08 wt. %, more preferably 0.05 wt. % to 0.07 wt. %, or 0.06 wt. % PAM per weight of the solution. In some embodiments, the HCl concentration in the polymer based HCl system is in a range of 5 to 15 wt. % and polymer (polyacrylamide) concentration in a range of 0.03 to 0.05 wt. %.

In an embodiment, the HCl system may also include one or more additives selected from an alcohol, a glycol, an organic solvent, a soap, a fragrance, a dye, a dispersant, a water softener, a bleaching agent, an antifouling agent, an antifoaming agent, an anti-sludge agent, a catalyst, a diverting agent, an oxygen scavenger, a sulfide scavenger, a retarder, a gelling agent, a permeability modifier, a bridging agent, a polyelectrolyte, a freezing point depressant, an iron-reducing agent, a viscosifier, a fluid loss prevention agent, a clay stabilizer, a weighting agent, a deflocculant, a lubricant, a crosslinker, a breaker, a biocide, a corrosion inhibiting agent, an anti-scaling agent.

In an embodiment, the viscosifier is an additive of the HCl system that increases viscosity of the HCl system. In some embodiments, the viscosifier may include, but is not limited to sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite. In some embodiments, the viscosifier may further include a natural polymer such as hydroxyethyl cellulose (HEC), carboxymethylcellulose, polyanionic cellulose (PAC), or a synthetic polymer such as poly(diallyl amine), diallyl ketone, diallyl amine, styryl sulfonate, vinyl lactam, laponite, polygorskites (such as attapulgite, sepiolite), and combinations thereof. In some embodiments, the viscosifier may further include one or more thickening agents such as XC-polymer, xanthan gum, guar gum, glycol, and combinations thereof. In some embodiments, the viscosifier is bentonite. In some embodiment, the 'bentonite' may refer to potassium bentonite, sodium bentonite, calcium bentonite, aluminum bentonite, and combinations thereof, depending on the relative amounts of potassium, sodium, calcium, and aluminum in the bentonite. In some embodiments, the viscosifier is a corn starch.

In some embodiments, the fluid loss prevention agent is an additive of the HCl system that controls loss of the HCl system when injected into the subterranean geological formation. In some embodiments, the HCl system may include multiple fluid loss prevention agents depending on the customized need of a user. In some embodiments, the fluid loss prevention agent may include, but is not limited to, starch, polysaccharides, silica flour, gas bubbles (energized fluid or foam), benzoic acid, soaps, resin particulates, relative permeability modifiers, degradable gel particulates, hydrocarbons dispersed in fluid, and one or more immiscible fluids. In some embodiments, the fluid loss prevention agent may include the corn starch and poly(vinyl butyral)-co-vinyl alcohol-co-vinyl acetate (PVBA).

In some embodiments, the clay stabilizer is an additive of the HCl system that aids in the stabilization of shales and to control swelling clays. In some embodiments, the clay stabilizer may include an alkaline earth metal halide salt. In some embodiments, the alkali metal halide salt may include, but is not limited to, potassium chloride, sodium chloride, lithium chloride, rubidium chloride, and cesium chloride. In some embodiments, the alkaline earth metal halide salt may include, but is not limited to, calcium chloride, and magnesium chloride.

In an embodiment, the weighting agent is an agent that increases an overall density of the HCl system in order to provide sufficient bottom-hole pressure to prevent an unwanted influx of formation fluids. In some embodiments, the weighting agent may include, but is not limited to, calcium carbonate, barite, sodium sulfate, hematite, siderite, ilmenite. In some embodiments, the weighting agent is hydrophobic metallic zinc nanoparticles.

In an embodiment, the deflocculant is an additive of the HCl system that prevents a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho.

In some embodiments, the lubricant is an additive of the HCl system and may include, but is not limited to, polyalpha-olefin (PAO), synthetic esters, polyalkylene glycols (PAG), phosphate esters, alkylated naphthalenes (AN), silicate esters, ionic fluids, LUBE 1017OB, and multiply alkylated cyclopentanes (MAC).

In some embodiments, the HCl system may also include a crosslinker. The crosslinker is an additive of the HCl system that can react with multiple-strand polymers to couple molecules together, thereby creating a highly viscous fluid, with a controllable viscosity. In an embodiment, the crosslinker may include, but is not limited to, metallic salts, such as salts of Al, Fe, B, Ti, Cr, and Zr, or organic crosslinkers such as polyethylene amides and formaldehyde.

In an embodiment, the breaker is an additive of the HCl system that provides a desired viscosity reduction in a specified period of time. In an embodiment, the breaker may include, but is not limited to, oxidizing agents, such as sodium chlorites, sodium bromate, hypochlorites, perborate, persulfates, peroxides, and enzymes.

In an embodiment, the biocide is an additive of the HCl system that may also help to kill microorganisms. In an embodiment, the biocide may include, but is not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanedial.

In an embodiment the corrosion inhibiting agent is an additive of the HCl system that may decrease the corrosion rate of a material, more preferably, a metal or an alloy, which comes into contact with the HCl system. In some embodiments, the corrosion inhibiting agent may include, but is not limited to, imidazolines, and amido amines. In some embodiments, the corrosion inhibiting agent may include, but is not limited to, oxides, sulfides, halides, nitrates, preferably halides, of metallic elements of group IIIa to Via such as $SbBr_3$.

In an embodiment, the anti-scaling agent is an additive of the HCl system that inhibits the formation and precipitation of crystallized mineral salts that form scale. In an embodiment, the anti-scaling agent may include, but is not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), and polymers of sulfonic acid on a polycarboxylic acid backbone. In some embodiments, the anti-scaling agent may further include phosphine, sodium hexametaphosphate, sodium tripolyphosphate and other inorganic polyphosphates, hydroxy ethylidene diphosphonic acid, butane-tricarboxylic acid, phosphonates, itaconic acid, and 3-allyloxy-2-hydroxy-propionic acid. In some embodiments, the HCl system may include metal sulfide scale removal agents such as hydrochloric acid.

In an embodiment, the method 100 further includes flooding the rock sample with at least one acid selected from the group consisting of acetic acid, citric acid, formic acid, polymer-based acids, VES-based acids, emulsified acids, foam-based acids, and chelating agents-based stimulation fluids. In an embodiment, the chelating agents-based stimulation fluids may further include, but are not limited to, ethylenediamine tetra acetic acid (EDTA), hydroxyethylenediamine triacetic acid (HEDTA), and glutamic diacetic acid (GLDA). In an embodiment, the chelating agents-based stimulation fluids may further include nitrilotriacetic acid (NTA), diethylenetriaminepentaacetic acid (DTPA), methylglycinediacetic (MGDA) acid, 2-hydroxyethyliminodiacetic acid, CDTA trans-cyclohexane-1,2-diaminetetraacetic (HEIDA) acid, ethylene glycol-bis3-aminoethyl ether-N,N, N',N'-tetraacetic (EGTA) acid, ethylenediaminediacetic (EDDA) acid, propylene diamine tetraacetic acid (PDTA), ethylene diamine-N,N"-dihydroxyphenylacetic acid (EDDHA), ethylene diamine-N,N"-di-hydroxy-methylphenyl acetic acid (EDDHMA), and derivatives or salts thereof.

At step 106, the method 100 includes measuring a second porosity, a pore size distribution, and a diffusion tortuosity of the rock samples with the NMR. The second porosity, the second pore size distribution, and the second diffusion tortuosity refer to the porosity, pore size distribution, and diffusion tortuosity of the rock sample after acid treatment. In an embodiment, the diffusion tortuosity is measured in each direction with NMR. In an embodiment, the diffusion tortuoisty is measured in a first direction parallel to the created wormhole and a second direction orthogonal to the created wormhole. In an embodiment, the diffusion tortuosity is measured in a third direction orthogonal to both the first direction and the second direction. In an embodiment, a stand-alone NMR methodology (no supporting methods) determines the diffusion tortuosity, the porosity, and the pore size distributions, as well as the anisotropy of tortuosity and porosity.

At step 108, the method 100 includes establishing a diversion index (DI) as a ratio between the diffusion tortuosity in a first direction and the diffusion tortuosity in a second direction. In an embodiment, the first direction is an X-direction corresponding to a direction orthogonal to the wormhole and the second direction is a Y-direction corresponding to a direction parallel to the wormhole. In an alternate embodiment, the establishment of the diversion index further includes measuring a diffusion tortuosity in a third z-direction. The diversion index determined from three dimensions is a ratio of the diffusion tortuosity in the first and third direction compared to the diffusion tortuosity in the second direction. The diversion index calculated from three dimensions is a ratio of the diffusion tortuosity in the second and third direction compared to the diffusion tortuosity in the first direction. In an embodiment, step 108 further comprises determining an acid diversion capacity of the rock samples based on the acid diversion efficiency. In an embodiment, the acid diversion capacity is calculated by the same formula below, the diversion index. A higher diversion index correlates to a better diversion capacity of the system. The diversion capacity can be defined as the extent to which a rock sample can accommodate a tortuous path while treated with an acid. The more tortuous the path of an acid, the higher diversion capacity a rock sample will have. In an embodiment, computed tomography (CT) scans are taken of the rock samples after treated with the acid.

At step 110, the method 100 includes determining the acid diversion efficiency based off the diversion index. The diversion index (DI) is calculated by the following formula:

$$DI = \frac{\tau_{d,y}}{\tau_{d,x}}$$

where $\tau_{d,y}$ is the diffusion tortuosity in a direction parallel to the wormhole and $\tau_{d,x}$ is the diffusion tortuosity in a direction orthogonal to the wormhole. The method 100 further includes verifying the acid diversion efficiency by comparison to computed tomography (CT) scans of the wormholes in the rock samples. In an embodiment, the determining the acid diversion efficiency is calculated based on only the diffusion tortuosity.

In one aspect of the invention the NMR logging tool is placed at a depth in a borehole present in a subterranean rock formation. The NMR logging tool remains suspended in one or more of a production fluid (e.g., a mixture of hydrocarbons optionally containing water) or a well treatment fluid such as the HCl system described herein. Preferably the NMR logging tool is maintained at a first position (depth) within the borehole suspended in a column of the HCl system when measuring NMR data of the rock formation. The NMR logging tool obtains porosity and tortuosity data at a plurality of different depths within the subterranean rock formation, each time at a position (depth) suspended within the production fluid and/or HCl system fluid.

Preferably, the NMR logging tool remains placed in the borehole/wormhole at two pressure regimes. In a first pressure regime the production fluids are first removed from the borehole and the borehole is filled with the HCl system. First porosity and tortuosity data are then obtained. Subsequently the borehole is pressurized while the NMR to logging tool remains suspended therein. Preferably a packer is fixed at a higher elevation closer to the surface from the NMR logging tool. The packer defines pressure regions such that a lower region of the borehole is at a higher pressure than an upper region. The difference in pressure measured across the effective sealing length of the packer may amount to 500-20,000 psi, or 1,000-15,000 psi, or 5,000-10,000 psi. After pressurization, the NMR logging tool obtains second data including porosity and tortuosity measurements of wormholes or other reaction points such as pores affected by treatment of the subterranean rock formation with the HCl system at high pressure.

NMR data obtained at different depths in the borehole are used to prepare tortuosity maps/profiles of the subterranean rock formation. Subsequently, further rock treatment can be initiated according to the tortuosity map formed from the NMR logging data at a plurality of depths in the borehole.

Preferably, subsequent to acid treatment and NMR logging, and based on acid diversion efficiency measured or determined by the NMR logging after pressurization of the borehole with the HCl system, different sections defining different depths of the borehole may be subject to additional selective acid treatment and, preferably, high-pressure treatment such as fracturing. Based on a map/profile of acid diversion efficiency obtained from porosity and tortuosity data from the NMR logging, sections of the borehole are sealed, for example with packers, such that those sections of the subterranean rock formation having the best (highest) diversion efficiency are selectively treated and/or fractured. In a preferred embodiment of the invention only the section having the highest acid diversion efficiency is subject to fracturing. Remaining sections of the rock formation are sealed from direct fluid communication with the thus-isolated section of the borehole, for example by use of packers. The depth profile of the section of the subterranean rock formation having the highest acid diversion efficiency is typically less than 100 m of bore length, preferably less than 50 m or less than 20 m of bore length. Contrary to conventional methods for fracturing and acid treating a subterranean rock formation, production in the method disclosed herein is maintained out of a single section of the subterranean rock formation of relatively narrow length that corresponds to the region of greatest acid diversion efficiency.

In an embodiment, if the diversion index is above 0.7, an operator can begin hydrofracking on the bore hole. In an embodiment, if the diversion index is below 0.7, an operator must conduct further testing of the bore hole before beginning hydrofracking. In an embodiment, if the diversion index is above 0.65, an operator can begin hydrofracking on the bore hole. In an embodiment, if the diversion index is above 0.7, a second acid system can be added to the bore hole to promote hydrofracking. In an embodiment, the second acid system can be at least one selected from the group consisting of HCl, HCl and a VES, and HCl and PAM. In an embodiment, the second acid system injected into the bore hole is HCl and PAM. In an embodiment, if the diversion index is above 0.7, the CT scans are taken of the wormhole. In an embodiment, if the diversion index is below 0.7, the CT scans are not taken of the wormhole. In an embodiment, if the diversion index is above 0.7, a different formulation with higher concentrations of HCl and PAM is deployed as the second acid system, preferably 15 to 25 wt. %, hydrochloric acid per weight of the solution and of from of from 0.1 wt. % to 0.5 wt. % of PAM. In an embodiment, if the diversion index is below 0.7, a different formulation of HCl is deployed with HCl at a higher concentration, preferably 25 wt. % to 40 wt. % of the system. In an embodiment, if the diversion index is below 0.7, a different formulation of HCl and VES is deployed with HCl at a higher concentration, preferably 25 wt. % to 40 wt. % of the system and 5 wt. % to 15 wt. % of VES of the system. In an embodiment, if the diversion index is above 0.7, an HCl system comprising citric acid and PAM is injected into the bore hole. In an embodiment, if the diversion index is above 0.7, then damage impact studies and pore connectivity tests are conducted on the bore hole to determine the potential for hydrofracking as well as structural integrity of the bore hole after acid treatment.

EXAMPLES

The following examples describe and demonstrate exemplary embodiments of the method 100 to measure acid diversion efficiency in the rock sample described herein. The examples are provided solely for the purpose of illustration and are not to be construed as limitations of the present disclosure, as many variations thereof are possible without departing from the spirit and scope of the present disclosure.

Example 1. Methodology

Figure 2:
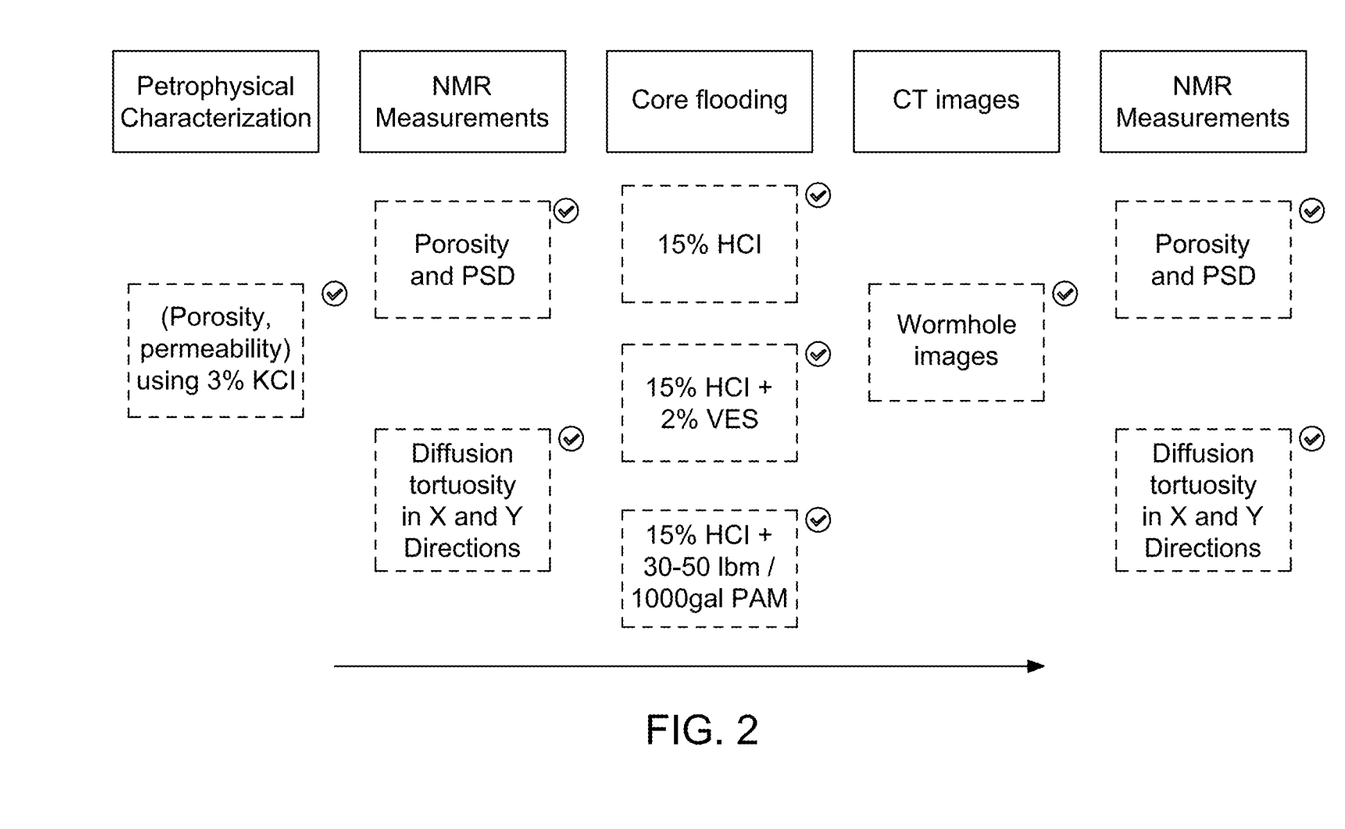
FIG. 2 is a flow chart of a method to evaluate the acid divergence through nuclear magnetic resonance (NMR) tortuosity measurements, according to certain embodiments.

FIG. 2 is a schematic block diagram depicting a method to determine the acid diversion efficiency using NMR. Porosity and permeability of three Indiana limestone (IL) rock samples (Ind-1, Ind-2, Ind-3), also referred to as the core samples, were measured. The NMR was then used to measure the rock porosity and pore size distribution. The NMR was also used to measure the diffusion tortuosity after acid treatment in orthogonal directions such as the X-direction (orthogonal to wormhole propagation direction) and Y-direction (parallel to wormhole propagation direction). Then core flooding was conducted by injecting the HCl systems into the core samples until wormhole breakthrough (see for example US 2021/0372954 A1 incorporated herein by reference in its entirety). The HCl systems include the straight HCl, VES-based hydrochloric acid, and polymer-based HCl. The Ind-1, Ind-2, Ind-3 samples were treated with the straight HCl, VES-based HCl, and polymer-based HCl, respectively. More specifically, the Ind-1 was treated with 15% HCl; Ind-2 was treated with 15% HCl and 2% VES; and Ind-3 samples was treated with 30-50 lbm/1000 gal PAM, respectively. The CT scan was then used to image the treated samples to visualize the wormholes created. Finally, similar NMR measurements were conducted after the treatment.

Example 2. Results

The core samples were characterized as shown in Table 1.

TABLE 1

Petro-physical characterization of the rock samples

| Sample ID | L, cm | D, cm | Permeability, md | Porosity, % | Porosity after acidizing, % |
|---|---|---|---|---|---|
| Ind-1 | 7.259 | 3.793 | 3.96 | 16 | 16.16 |
| Ind-2 | 7.735 | 3.808 | 6.13 | 15.7 | 16.3 |
| Ind-3 | 7.473 | 3.802 | 1.66 | 15.8 | 19.18 |

Table 1 shows that the core samples have same dimensions such as 1.5-inch×3 inch and similar porosity but slightly different permeability. From Table 1, it can be observed that the porosity of Ind-1, Ind-2, Ind-3 samples is 16, 15.7%, and 15.8%. However, after acidizing a moderate increase in porosity (about 1-3%) was observed for the Ind-1, and Ind-2. However, the percentage increase in porosity was found to be in the range of 17-20% for the Ind-3 after acidizing with the polymer-based HCl system (30-50 lbm/1000 gal PAM). The results indicate that the choice of the HCl system plays an important role on determining the acid diversion capabilities.

Figure 3:
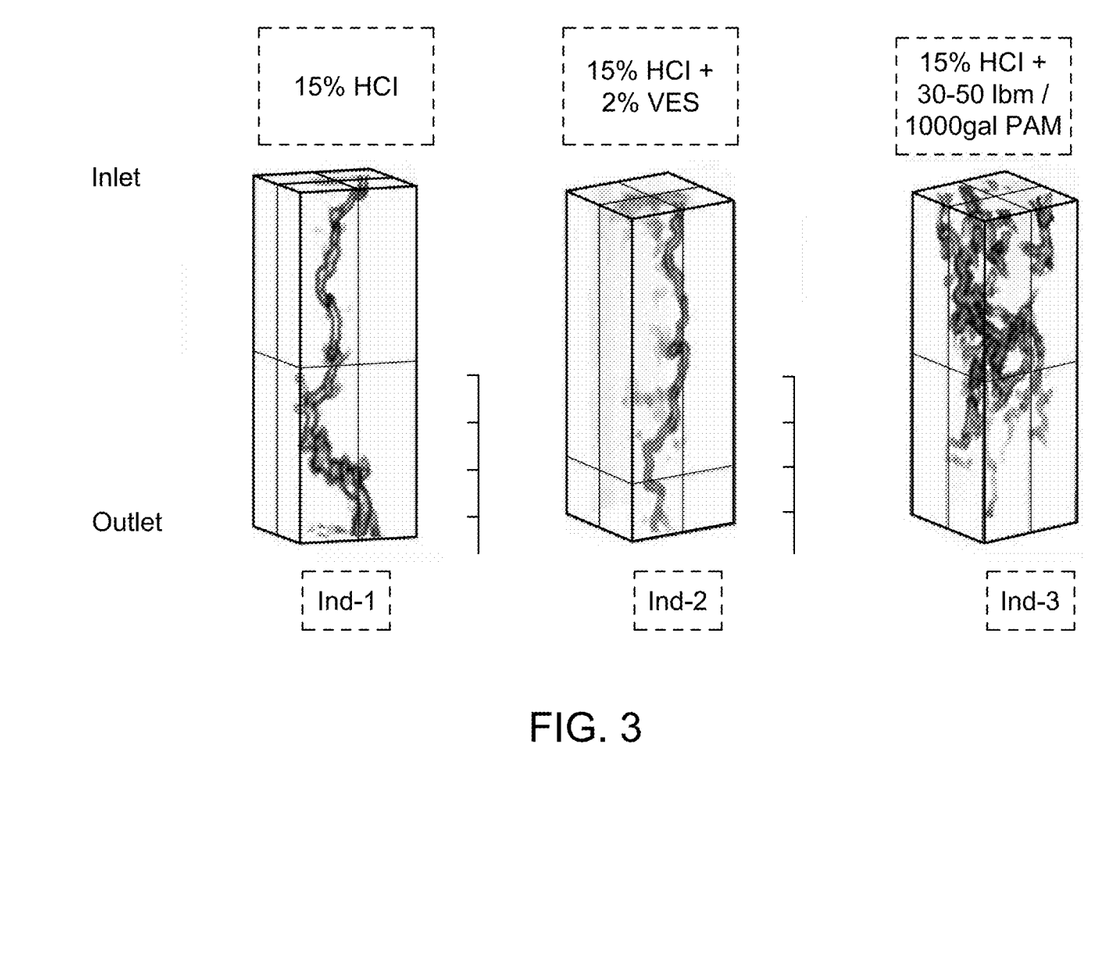
FIG. 3 depicts computed tomography (CT) scans of wormholes created by HCl systems in rock samples, according to certain embodiments.

FIG. 3 shows CT scan images of the core samples after acidizing. The core sample treated with the PAM polymer (Ind-3) showed a tortuous wormhole, while the samples (Ind-1, and Ind-2) treated with VES-based HCl and straight HCl treatments showed a straight wormhole. The VES-based HCl acid did not show good diversion in zigzagged wormhole, which could be attributed to the poor mixing of the fluid. The straight HCl acid exhibits lesser diversion ability and creates a straight wormhole, as can be observed in FIG. 3.

Figure 4:
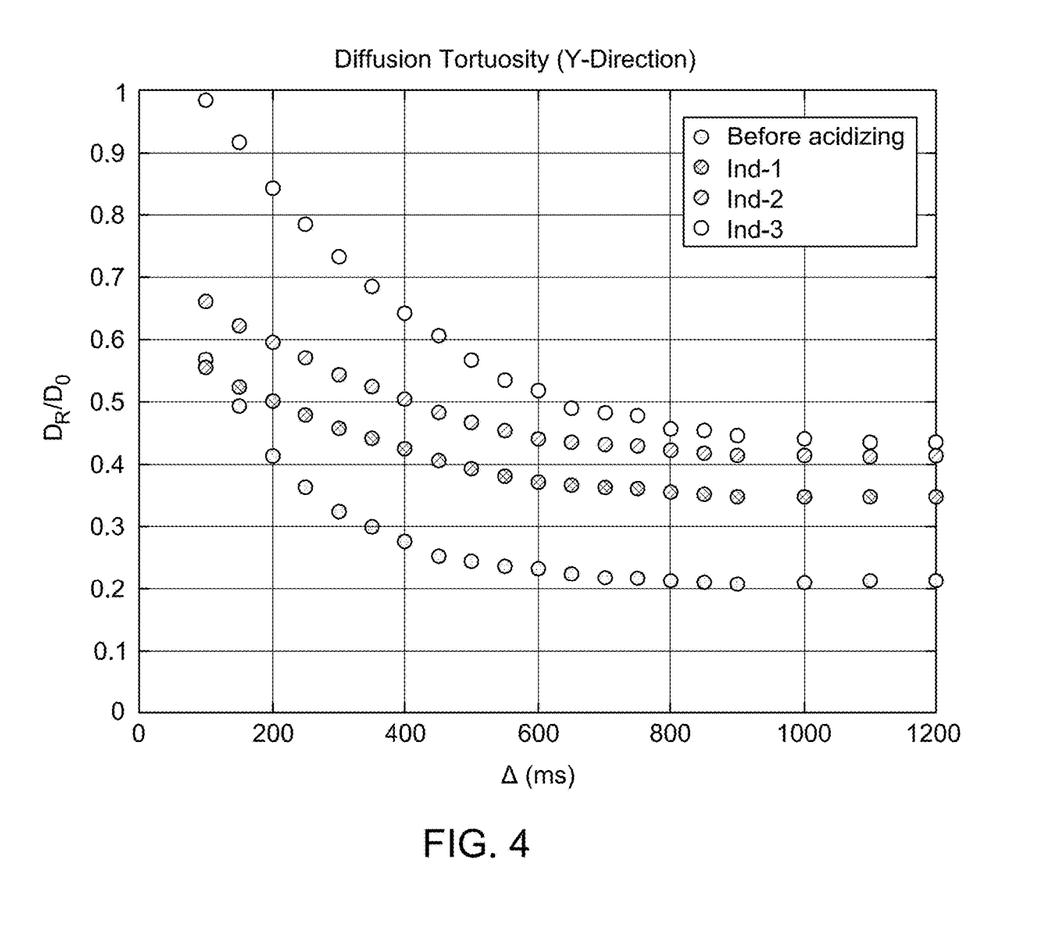
FIG. 4 is a graph depicting diffusion tortuosity measurements in the Y-direction at different diffusion times, according to certain embodiments.

FIG. 4 shows diffusion tortuosity measurements of the core samples before and after acidizing. Diffusion coefficient drops initially and reaches an asymptotic value at longer diffusion times. At such long times, molecules diffused through large enough pore space volumes, and hence corresponding effective level does not change with time. The inverse of the asymptotic value represents the diffusion tortuosity. Table 2 shows calculated values of the diffusion tortuosity before and after acidizing.

TABLE 2

PFG-NMR diffusion tortuosity estimation at different directions

| Sample Name | $\tau_d$ (Y- Direction) | $\tau_d$ (X- Direction) | $I_d$ |
|---|---|---|---|
| Before Acidizing | 4.71 | 4.66 | — |
| Ind-1 | 2.88 | 4.33 | 0.67 |
| Ind-2 | 2.42 | 4.41 | 0.55 |
| Ind-3 | 2.3 | 2.57 | 0.9 |

Table 2 shows that the tortuosity was higher before creating wormholes in the rock. In general, large open spaces within the rock tend to reduce the rock tortuosity, and hence the wormholes did the same. An acid diversion is considered to be effective if tortuosity reduction in both X and Y directions are similar. The tortuosity reduction is supported by the formation of a zigzagged wormhole as in the PAM treatment of the Ind-3 sample. Table 2 shows a significant reduction of the diffusion tortuosity in both directions. On the other hand, the straight wormholes created by the straight and VES-based HCl acids showed a reduction of tortuosity only on the Y-direction (see Table 2). The formation of straight wormholes indicates poor diversion as acid did not react significantly in the direction opposite to the wormhole direction. The straight and VES-based HCl acids did not divert well in the Ind-1 and Ind-2 samples but followed the least resistance path. Table 2 further indicates that the higher diversion index leads to the better diversion capacity of the HCl system.

The present disclosure provides the method 100 which includes the use of the efficient and accurate NMR technology. The NMR is used to evaluate chemical diverters' diversion ability through the tortuosity measurements. Detailed NMR scanning of the core was found to be an efficient assessing tool for locating the created wormholes.

Numerous modifications and variations of the present disclosure are possible in light of the above teachings. It is therefore to be understood that within the scope of the appended claims, the invention may be practiced otherwise than as specifically described herein.

The invention claimed is:

1. A method to measure acid diversion efficiency in a rock sample, comprising:
   measuring a first porosity and a permeability of the rock sample;
   flooding a core region of the rock sample with a hydrochloric acid (HCl) system to create a wormhole, wherein during the flooding the HCl system penetrates from a first end of the rock sample to a second end of the rock sample to form the wormhole;
   measuring, with NMR, a first diffusion tortuosity $\tau_{d,x}$ in an X-direction corresponding to a direction orthogonal to the wormhole;
   measuring, with NMR, a second diffusion tortuosity $\tau_{d,y}$ in a Y-direction corresponding to a direction parallel to the wormhole;

calculating a diversion index (DI) by the following formula:

$$DI = \frac{\tau_{d,y}}{\tau_{d,x}}$$

2. The method of claim 1, wherein an NMR logging tool remains placed in the wormhole at two pressure regimes.

3. The method of claim 1, wherein if the diversion index is above 0.7, an operator can begin hydrofracking on a bore hole a subterranean rock formation.

4. The method of claim 1, wherein the HCl system is at least one selected from the group consisting of a solution comprising hydrochloric acid, a solution comprising HCl and a viscoelastic surfactant (VES), and a solution comprising HCl and a polymer.

5. The method of claim 4, wherein the HCl system comprises HCl and the VES as a mixture containing from 10 weight % (wt. %) to 20 wt. % hydrochloric acid per weight of the solution and of from 1 wt. % to 5 wt. % VES per weight of the solution.

6. The method of claim 4, wherein the HCl system comprises the HCl and the polymer as a mixture containing from 10 wt. % to 20 wt. % hydrochloric acid per weight of the solution and of from 0.02 wt. % to 0.1 wt. % of a polyacrylamide (PAM) per weight of the solution.

7. The method of claim 4, wherein the HCl system has a pH of 1-6.

8. The method of claim 4, wherein the HCl system comprises HCl and the VES and has a pH of 1-6.

9. The method of claim 4, wherein the HCl system comprises HCl and the polymer and has a pH of 1-6.

10. The method of claim 1, wherein the method further comprises flooding the rock sample with at least one acid selected from the group consisting of acetic acid, citric acid, formic acid, a polymer-based acid, a VES acid, an emulsified acid, a foam acid, and a chelating agent-containing stimulation fluid.

11. The method of claim 1, wherein the measuring the first porosity of the rock sample includes treating the rock sample with potassium chloride (KCl).

12. The method of claim 1, wherein the measuring the permeability of the rock sample includes treating the rock sample with KCl.

13. The method of claim 1, wherein the rock sample is a carbonate formation rock with a permeability of 1 to 50 millidarcy.

14. The method of claim 1, wherein the rock sample has a porosity of 5-50%.

15. The method of claim 1, wherein the flooding is carried out at a temperature of 80-120° C.

16. The method of claim 1, further comprising:
verifying the acid diversion efficiency to computed tomography (CT) scans of the wormholes in the rock samples.

17. The method of claim 1, further comprising:
measuring, with NMR, the diffusion tortuosity in a third z-direction.

18. The method of claim 1, wherein if the diversion index is below 0.7, a different HCl system is deployed with HCl at a concentration of 25 wt. % to 40 wt. % per weight of the HCl system.

19. The method of claim 1, wherein if the diversion index is below 0.7, a different HCl system comprising HCl and VES is deployed with HCl at a concentration of 25 wt. % to 40 wt. % per weight of the HCl system and 5 wt. % to 15 wt. % per weight of VES of the system.

* * * * *